Patented Sept. 21, 1948

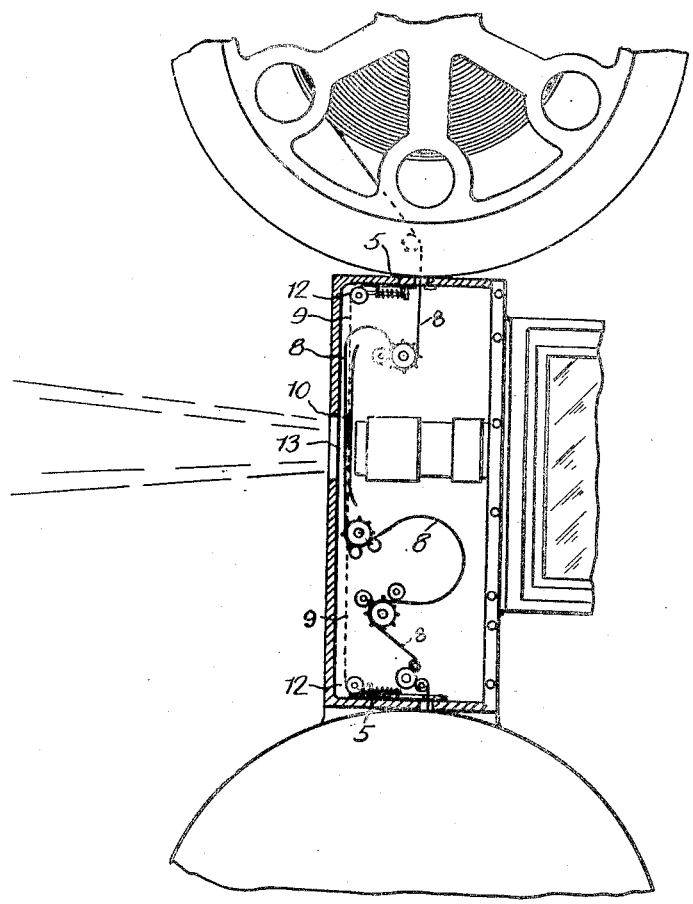

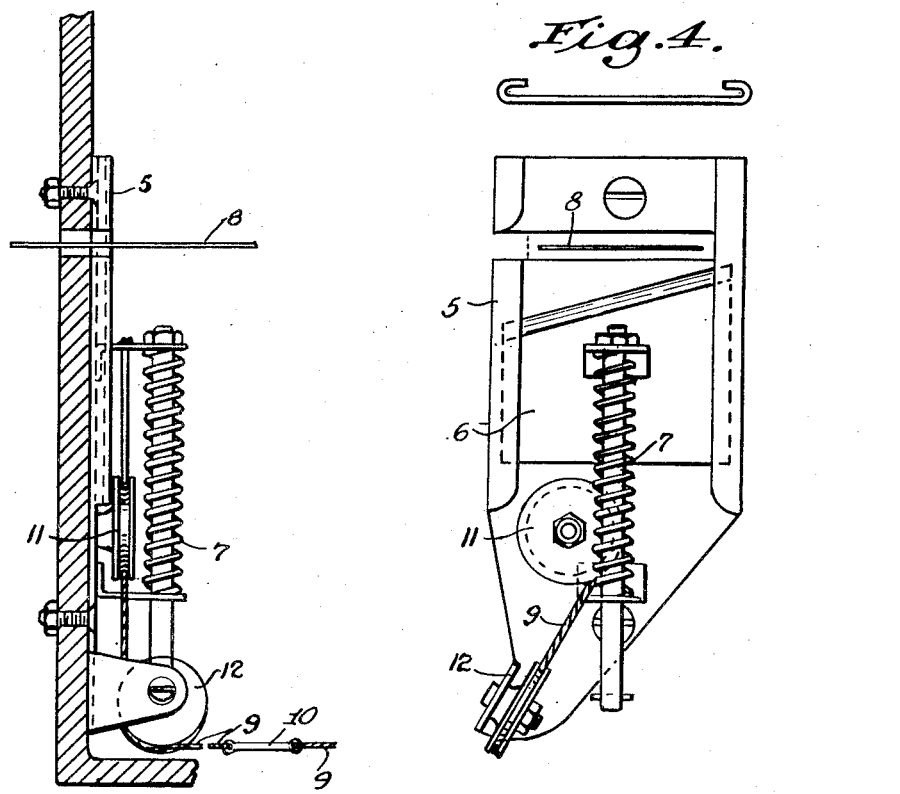

2,449,716

UNITED STATES PATENT OFFICE 2,449,716

AUTOMATIC FIREGUARD FOR MOTION-PICTURE PROJECTORS

Jules Francis Reney, Victoria, British Columbia, Canada

Application September 27, 1946, Serial No. 699,854

1 Claim. (Cl. 88—17)

This invention relates to the stoppage of fire in moving picture projectors and will limit the damage to only the short strip of film in the interior of the projector.

The principal object of this invention is to confine the damage to the short piece of film in the machine and to seal the openings so that the fire can do no further damage and safeguard the film on the reels in the machine.

With these and other objects in view that may appear as the description proceeds the invention consists of the novel construction and arrangement of cooperating parts as hereinafter more specifically set forth, claimed and shown in the accompanying drawings forming part of this application and in which:

Fig. 1 is a section of a projector showing the location of the controls, also Fig. 2 is a side view of the top control;

Fig. 3 is a plan view of Figure 2. This shows the gate used in the top of the machine and the lower gate is exactly similar but opposite hand so that the leading sheaves are in line vertically with the location of the fusible link and connector the severing of which operates both gates simultaneously.

Fig. 4 is an end view of the guide frame.

Referring to the drawings wherein like numerals denote like parts throughout the same, 5 is a guide frame mounted on the top and bottom walls of a projector housing in covering relation to the openings through which the film passes. The guide frame has a slot in register with the opening for the passage of the film and has its longitudinal edges turned inwardly to form guide flanges to receive a slidable shutter 6. The shutter has a beveled cutting edge for severing the film 8 when moved across the slot of the frame. The shutter is moved to cutting position by a compression spring 7 mounted on a rod supported by brackets attached to the shutter and guide frame. A wire cord 9 is connected to both shutters and is adapted to hold the springs under compression and the shutters retracted. A pair of sheaves 11 and 12 are mounted on the guide frame, the sheave 11 serving to direct the cord to its connection with the shutter and the sheave 12 acting to hold the cord between the upper and lower shutters in vertical alinement adjacent the edge of the film. A fusible link 10 is interposed in the cord 9 adjacent the film at the point of exposure, so if the film takes fire the link 10 will be fused thus releasing the cord 9. Releasing of the cord permits the springs 7 to expand thereby moving the shutters to sever the film and seal the openings through which the film passes. This confines the fire within the projector housing and prevents the fire from reaching the film on the reels above and below the projector.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

The combination with the housing of a film feeding mechanism of a motion picture projecting machine, of guide frames mounted on the top and bottom walls of the housing in covering relation to the openings through which the film passes, said frames having transverse slots in register with said openings for passage of the film and inturned longitudinal edges forming guide flanges, shutters slidably mounted in the guide flanges of said frames having a cutting edge for severing the film when moved across the slots of the frames, brackets attached to said frames and said shutters in longitudinal alinement, rods fixedly attached to the brackets of said shutters and slidably mounted in the brackets of said frames, compression springs mounted on said rods between said brackets adapted to move said shutters to sever the film and close the openings, a flexible wire having its ends connected to the brackets of said shutters adapted to hold said springs under compression and said shutters retracted, means for guiding said wire parallel to the film and adjacent thereto, and a fusible link interposed in said wire adjacent the film at the point of exposure.

JULES FRANCIS RENEY.

REFERENCES CITED

The following references are of record in the file of this patent:

UNITED STATES PATENTS

| Number | Name | Date |
|---|---|---|
| 1,061,101 | Morton | May 6, 1913 |
| 1,111,376 | Goodwin | Sept. 22, 1914 |
| 1,360,971 | Morton | Nov. 30, 1920 |
| 1,728,739 | Spaulding | Sept. 17, 1929 |
| 2,092,468 | Oser | Sept. 7, 1937 |